United States Patent [19]

Risse

[11] 4,029,602
[45] June 14, 1977

[54] CATALYST SYSTEM FOR CATALYTIC HEATERS

[75] Inventor: Roger Paul Pierre Risse, Caluire, France

[73] Assignee: Societe Lyonnaise des Applications Catalytiques, Rillieux-La-Pape, France

[22] Filed: Jan. 14, 1976

[21] Appl. No.: 648,869

Related U.S. Application Data

[63] Continuation of Ser. No. 471,752, May 20, 1974, abandoned.

[30] Foreign Application Priority Data

May 22, 1973 France .............................. 73.19582

[52] U.S. Cl. ............................... 252/458; 252/465; 252/469; 252/470; 252/477 R

[51] Int. Cl.$^2$ .................... B01J 21/04; B01J 21/08; B01J 23/64

[58] Field of Search .......... 252/458, 465, 469, 470, 252/477 R

[56] References Cited

UNITED STATES PATENTS 3,697,447  10/1972  Bettinardi ...................... 252/477 R Primary Examiner—W. J. Shine
Attorney, Agent, or Firm—Karl F. Ross; Herbert Dubno

[57] ABSTRACT

A catalyst system for a catalytic heater comprises a support of a refractory material upon which is deposited by cocrystallization at least one oxide from a Group VI (B) element and at least one oxide from a Group VII (B) or a Group VIII (4th Period) element in addition to a promoter from the platinum-metal group.

7 Claims, No Drawings

CATALYST SYSTEM FOR CATALYTIC HEATERS

This is a continuation of application Ser. No. 471,752, filed May 20, 1974 (now abandoned).

FIELD OF THE INVENTION

The present invention relates to an oxidation catalyst system for the oxidation of hydrocarbons such as propane, butane, and their homologs, particularly for use in catalytic (flameless) heaters.

BACKGROUND OF THE INVENTION

Generally so-called catalytic heaters, which effect catalytic oxidation of hydrocarbons on contact, have an active phase constituted by the noble metals of group VIII (Periods 5 and 6) of the PERIODIC TABLE OF THE ELEMENTS (see the Periodic Chart of the Elements at pages 448 and 449 of the Handbook of Chemistry and Physics, 41st Edition 1959/60). The most commonly used of these platinum-group elements is platinum itself because of its relatively high catalytic activity.

There are several disadvantages to using platinum, firstly, even when used in small quantities it is an expensive metal. Secondly, it is highly susceptible to poisoning and to coating with deposits such as carbon which develop rapidly if the support for the catalyst contains iron oxide and the gas being oxidized contains high proportions of ethylenic hydrocarbons.

OBJECTS OF THE INVENTION

It is an object of the present invention to provide an improved catalyst for the contact oxidation of hydrocarbons in which the aforedescribed disadvantages are obviated.

Another object is to provide a support for the improved catalyst.

A further object is the provision of a catalyst system particularly usable in so-called catalytic or flameless devices.

DESCRIPTION OF THE INVENTION

These objects are attained according to the present invention in a catalyst which is formed principally of semiconductor oxides. More particularly at least two oxides chosen from groups VI(B), VII(B), VIII(Fourth period) of the PERIODIC TABLE OF THE ELEMENTS (see the Periodic Chart of the Elements at pages 448 and 449 of the Handbook of Chemistry and Physics, 41st Edition 1959/60) are employed, the two oxides being selected from different groups, at least one of which is group VI(B).

For the purpose of the present disclosure, the metals of the platinum group or family are considered to be those found in Periods 5 and 6 of Group VIII of the PERIODIC CHART OF THE ELEMENTS (pages 448 and 449 of the Handbook of Chemistry and Physics, 41st Edition, 1959/1960) and to be constituted by the elements platinum, palladium, iridium, rhodium, osmium and ruthenium.

When reference is made herein to the elements of Group VI(B) of the PERIODIC TABLE it should be understood that these elements are chromium, molybdenum and tungsten. The elements of Group VII (B) for the purposes of the present invention are manganese, technetium and rhenium. The elements of Group VIII (4th Period) which are referred to herein are the so-called transition metals consisting of cobalt, iron and nickel.

While I have pointed out above that the basic catalyst system of the present invention comprises a refractory support upon which at least two semiconductive oxides are deposited by cocrystallization from a common solution and which also includes one of the platinum-group metals, the system can be more particularized as follows:

The support may be preferably silica, alumina or an alumino silicate in any desired form permeable by the gases traversing the catalytic mass. At least one oxide of a Group VI(B) metal is always present and at least one other oxide from Group VII(B) or Group VIII (4th Period) is likewise always present. The system further comprises at least one element from Group VIII(5th and 6th Periods) as a reaction promoter.

In the system, the support may constitute up to 90% by weight and preferably at least 25% by weight while the balance of 75% by weight to 10% by weight is constituted by the active catalyst components. A promoter as described below may be present in an amount ranging between 0 and 10% by weight, the metal of the platinum group is present in an amount of 0.01 to 10% by weight but preferably no more than 5% by weight, the oxide of the Group VI(B) metal should be present in an amount ranging from 0.5 to 15% by weight and the oxides of the Group VII(B) or Group VIII (4th period) metal should be present in an amount ranging between 0.5 and 15% by weight. Preferably a chromium oxide is present with either or both of a cobalt oxide and a manganese oxide, with platinum being the activator.

Such oxide catalysts have certain inherent advantages over catalysts which are reducing metals. Their thermal stability is much greater and they are less sensitive to poisons and to coating. In addition such oxide catalysts are of substantially lower cost then the hitherto used catalysts from the platinum group, such as rhodium, palladium, and iridium.

Reference is made herein to French Patent No. 1,466,195 of 31 January 1966 and British Patent No. 862,771 which have investigated the characteristics of platinum-type catalysts of the character previously described as constituting the prior art.

According to a further feature of this invention the oxides of the catalyst include one from each of groups VI(B) and VIII (fourth period) of the PERIODIC TABLE OF THE ELEMENTS (see the Periodic Chart of the Elements at pages 448 and 449 of the Handbook of Chemistry and Physics, 41st Edition 1959/60). More particularly chromium oxides and cobalt oxides have been found particularly useful. These oxide catalysts have an especially high catalytic activity when they are employed in a particularly homogeneous cocrystallization (i.e. crystals formed by coprecipitation). It may be necessary in certain cases to activate the oxide catalyst so that the temperature at which the catalytic reaction starts should be as low as possible and thereby limit the time necessary for the catalytic mass to function.

Thus in accordance with the present invention the oxide catalysts are doped by introducing into the active component an oxidation catalyst which is more active and which can be based on a metal or a group of metals from the platinum group, platinum being particularly suitable. This doping operation uses relatively small quantities of noble metals relative to the total active mass. Much less of these expensive metals is needed than in the cases where they alone constitute the active mass.

Such a catalyst can oxidize completely a large number of organic compounds, especially the hydrocarbons mentioned previously.

In accordance with a further feature of this invention the support for such a catalyst can be any form of abbestos, silica, alumina, or any other refractory such as metallic sheet or foil, sintered metal, and the like. Any fibrous material or agglomerate inert at the working temperature of the catalytic composition can be used.

Silica in accordance with this invention is particularly suited for use as the support. It can be used in the form of a fiber mat or layer for receiving the catalyst as described in French Patent No. 1,505,615.

In accordance with a further feature of this invention it has been discovered that two elements of groups VI(B) and VIII(fourth period) of the PERIOD TABLE OF THE ELEMENTS (see the Periodic Chart of the Elements at pages 448 and 449 of the Handbook of Chemistry and Physics, 41st Edition 1959/60) are particularly suited for forming the active mass of oxide catalysts, namely chromium and cobalt. The activation or doping element usable with these elements is platinum. The salts (E.G. Nitrates) of thee elements which are soluble or decomposable by heat are brought into solution, in a common solvent e.g. watery then deposited on silica fibers as described in the above-mentioned patent. Subsequent calcination giving the following products: platinum sponge, chromium (III) oxide and the oxides of $Co^2$ $Co^3$, all being perfectly homogeneous in a cocrystallization system.

According to yet another feature of this invention there is introduced into the active mass a recrystallization inhibitor serving primarily to stabilize the reduced platinum in its most active crystalline form. This promoter can be a refractory oxide obtained during the thermal treatment of a salt deposited on the support, the salt of the element constituting the promoter base having been previously mixed and dissolved with other salts. The elements selected are of high electronic density whose oxides have melting points considerably higher than that of the active element which is to be stabilized.

The proportions of base elements going into the catalytic composition are carefully defined so that there is obtained a level of efficiency close to 100% for a space-time rate on the order of 125 for butane for example. This means that in 1 hour 125 volumes of butane are treated on 1 volume of the catalyzer and its support, the volume of the contact mass being in this case defined by the formula $M/da$ wherein $da$ equal the apparent density of the contact mass and M its mass.

The ratio: catalysts components/mass of butane oxidized in 1 hour can be:

$CoO + Co_2O_3 = 42.5 \times 10^{-4}$,
$Cr_2O_3 = 44 \times 10^{-4}$,
$P_t = 12 \times 10^{-4}$, and
Promoter $= 12 \times 10^{-4}$.

In accordance with yet another feature of this invention two supports are used. The first support serves to disperse the active mass, the second support serves to allow the active mass to be placed in a condition for use on the first support. The first support is chosen so as to stabilize the catalytic oxide mainly by inhibiting recrystallization due to the temperature at which the contact mass is used. The first support is formed of a refractory oxide powder such as $SiO_2$, $Al_2O_3$ MgO and $ThO_2$.

Preferably a refractory oxide is used having a large specific surface, for example alumina.

The kind of alumina which is particularly suitable for use in accordance with the present invention is defined by the size of the granules and the specific surface but may be that described in French Patent No. 1,367,925. An alumina whose granulometry has grains of a diameter between 0.1 and 30 microns, preferably not greater than 20 microns, and whose specific surface B.E.T. lies between 70 and 350 $M^2/g$, preferably between 150 and 250 $M^2/g$, is perfectly suitable. It should be noted that too large a specific surface generally means that there are open pores having very small openings which has the disadvantage that gas will stagnate inside the pores due to the irreversible adsorption of the gas.

The catalytic oxides and the activation element, platinum, deposited on the alumina give a powder which is particularly active and whose specific surface B.E.T. lies between 80 and 250 $M^2/g$ according to the alumina used. This active mass is then deposited on the second support necessarily formed by refractory fibers or any arrangement of fibers, or constituted by agglomerates inert at the operation temperature of the catalytic mass. Silica fibers deposited in a layer are extremely advantageous for this type of second support.

The catalytic mass obtained in this manner allows a maximum contact area between the reactive and active particles. The conversion of hydrocarbon is practically total.

According to yet another feature of the present invention such a contact mass is prepared in the following manner: the alumina whose characteristics are given above is impregnated in an aqueous solution of chromium and cobalt salt, such as the nitrates. After having allowed the mixture to stand for several hours the hydroxides of chromium and of cobalt are precipitated by an ammonia solution or better by bubbling ammonia through them. The wet mass thus obtained is carefully rinsed so as to remove the mother liquor, it is dried, then finally calcined slowly from 100° to 600° C, then rapidly at this latter temperature. The pulverant compound obtained is constituted at $Al_2O_3$, $Cr_2O_3$, CoO, $Co_2O_3$ and is in its turn mixed into a solution containing a salt of a metal having a high catalytic activity such as platinum in the form of chloroplatinic acid for example. This solution can also contain another element in the form of a salt, which serves to form the promoter compound whose characteristics have been recited above. The space obtained is dried at 90° C as it is agitated. Then it is calcined slowly from 100° to 600° C while remaining at least fifteen minutes at this latter temperature. This produces an extremely active catalytic powder.

The deposition of the platinum and of its promoter on the chromium or cobalt oxides themselves previously on alumina has the advantage of producing a very homogenous wide dispersion of the platinum since the above-cited oxides also serve as a support for the platinum which itself serves as doping agent or activation element as described above.

The catalytic powder is suspended in a liquid which can advantgeously be water. The medium is maintained homogenous by rapid agitation. The particles thus suspended are deposited on the silica fiber preferably disposed in a layer, and the suspension liquid carries the particles over all of the fibers. It is possible to simply dip the fibers or to pour the suspension over them.

The fibers are then dried at a moderate temperature. This produces a contact mass having a considerable catalytic activity. It lies within the scope of the invention to employ an adhesive so as to fix the particles on the surface of the substrate. This latter operation has the advantage of preventing particle loss when the contact mass is being installed. It is desirable that this adhesive disappear entirely during the first use in service of the contact mass.

A first support has the following composition $Al_2O_3 = 69.55$ by weight;
$Cr_2O_3 = 2.225$ by weight;
$CoO + Co_2O_3 = 11.62\%$ by weight;
$Pt = 3.33\%$ by weight; and
Promoter = 3.33% by weight.

Such a catalytic composition is deposited on silica fibers and is capable of producing the complete combustion of hydrocarbons such as propane, butane, and their homologs with nearly 100% completeness. At the same time the ethyene hydrocarbons are perfectly oxidized. This catalytic composition can function perfectly for several thousand hours as long as catalyst/butane or propane ratio of 0.036 is maintained, or under the spatial velocity is held under 125 as indicated above.

The composition of the invention is particularly suited for use in catalytic heating devices.

I claim:

1. A catalytic mass for the oxidation of the hydrocarbons to produce carbon dioxide and water vapor which consists of, in effective amounts:
   active components of chromium oxide;
   at least one other catalyst oxide of an element of Group VIIB or Group VIII of the Periodic Table of Elemens;
   an activation metal consisting of one of the platinum-group elements; and
   a reaction promoter inhibiting recrystallization of the activation metal and constituted by a refractory oxide of an element having a high electron density; and a support for said active components, said support consisting of a first supporting mass of a pulverulent material having a high specific surface area and capable of dispersing the active components; and
   a second supporting mass of fibrous material in which said pulverulent material is distributed.

2. The catalytic mass defined in claim 1 wherein said catalytic mass consists of chromium oxide, cobalt oxide, platinum and, as said promoter, thorium oxide.

3. The catalytic mass defined in claim 1 wherein said active components consist of chromium oxide, manganese oxide, platinum and, as said promoter, thorium oxide.

4. The catalytic mass defined in claim 1 wherein said first supporting mass is a refractory oxide.

5. The catalytic mass defined in claim 4 wherein said first suppoting mass is alumina.

6. The catalytic mass defined in claim 1 wherein said fibrous material consists of silica fibers 7. A process for producing a catalyst mass for the total combustion of hydrocarbons to carbon dioxide and water vapor in a catalytic heater, said process comprising impregnating a pulverulent refractory oxide having a high specific surface area with an aqueous solution of a chromium salt and at least one further element from Group VIIB or Group VIII of the Periodic Table of Elements in the form of its nitrate over a period of several hours; precipitating hydroxides from said solution by ammoniating it to obtain a paste; washing said paste, drying and calcinating said paste at a temperature of 100° to 600° C to form a pulverulent composition; impregnating said pulverulent composition with chloroplatinic acid and a solution of a salt of an element adapted to form a refractory oxide inhibiting recrystallization of platinum to form a further paste, drying said further paste at about 90° C; calcinating the dried further paste at a temperature of 100° to 600° C for a period of at least fifteen minutes to form a catalytic powder; suspending said catalytic powder in water and agitating the resulting suspension; applying said suspension to a supporting mass of fibrous materials; and drying the suspension applied to said fibrous material.

* * * * *